United States Patent [19]

Sakaguchi et al.

[11] Patent Number: 4,778,025

[45] Date of Patent: Oct. 18, 1988

[54] METHOD FOR CONTROLLING SLIP OF A DRIVING WHEEL OF A VEHICLE

[75] Inventors: Masakazu Sakaguchi; Shuji Shiraishi; Takashi Nishihara, all of Wako, Japan

[73] Assignee: Honda Giken Kogyo Kabushiki Kaisha, Tokyo, Japan

[21] Appl. No.: 59,452

[22] Filed: Jun. 8, 1987

[30] Foreign Application Priority Data

Jun. 9, 1986 [JP] Japan .............................. 61-133176
Jun. 9, 1986 [JP] Japan .............................. 61-133177

[51] Int. Cl.$^4$ .......................................... B60K 28/16
[52] U.S. Cl. .................................. 180/197; 303/100; 303/110
[58] Field of Search .............. 180/197, 247; 364/426; 303/100, 105, 110, 111; 188/181 A, 181 C

[56] References Cited

U.S. PATENT DOCUMENTS

| | | |
|---|---|---|
| 3,169,595 | 2/1965 | Shepherd . |
| 3,288,232 | 11/1966 | Shepherd . |
| 3,400,776 | 9/1968 | Smith ................................. 180/197 |
| 3,532,392 | 10/1970 | Scharlack . |
| 3,532,393 | 10/1970 | Riordan . |
| 3,560,759 | 2/1971 | Buehler . |
| 3,586,385 | 6/1971 | Florus . |
| 3,617,099 | 11/1971 | Sugiyama . |
| 3,622,973 | 11/1971 | Domann . |
| 3,627,074 | 12/1971 | Burckhardt ........................ 180/197 |
| 3,632,176 | 1/1972 | Gaeke . |
| 3,659,263 | 4/1972 | Gunsser ........................ 180/197 X |
| 3,659,906 | 5/1972 | Horvath . |
| 3,667,813 | 6/1972 | Burckhardt . |
| 3,680,655 | 8/1972 | Beyerlein . |
| 3,701,568 | 10/1972 | Lewis . |
| 3,741,043 | 6/1973 | Oya . |
| 3,771,839 | 11/1973 | Fink . |
| 3,776,322 | 12/1973 | Misch . |
| 3,776,357 | 12/1973 | Arai ................................. 180/197 |
| 3,779,331 | 12/1973 | Burckhardt ........................ 180/197 |
| 3,780,346 | 12/1973 | Gagnon . |
| 3,802,529 | 4/1974 | Burckhardt ........................ 180/197 |
| 3,811,526 | 5/1974 | Adahan ............................. 180/197 |
| 3,823,373 | 7/1974 | Pike .................................. 324/73 R |
| 3,871,235 | 3/1975 | Anderson ............................. 73/510 |
| 3,910,647 | 10/1975 | Takeuchi ........................ 180/197 X |
| 3,912,034 | 10/1975 | Pallof ................................. 180/197 |
| 3,938,611 | 2/1976 | Bertolasi ............................. 180/197 |
| 3,938,612 | 2/1976 | Boudeville ......................... 180/197 |
| 3,941,203 | 3/1976 | Leconte .............................. 180/197 |
| 3,967,862 | 7/1976 | Hunter .......................... 180/197 X |
| 4,066,300 | 1/1978 | Devlin ................................. 303/96 |
| 4,154,487 | 5/1979 | Vannini .......................... 180/197 X |
| 4,312,249 | 1/1982 | Hau .................................... 74/866 |
| 4,347,569 | 8/1982 | Allen, Jr. ....................... 180/197 X |
| 4,354,568 | 10/1982 | Griesenbock ..................... 180/197 |
| 4,375,599 | 3/1983 | Bleckmann ........................ 307/519 |
| 4,432,430 | 2/1984 | Lind ................................... 180/197 |
| 4,480,309 | 10/1984 | Burckhardt ........................ 364/426 |
| 4,521,856 | 6/1985 | Phelps .......................... 180/197 X |
| 4,545,455 | 10/1985 | Kanemura ......................... 180/197 |
| 4,554,990 | 11/1985 | Kamiya .............................. 180/197 |
| 4,583,611 | 4/1986 | Frank ................................. 180/197 |
| 4,671,373 | 6/1987 | Sigl .................................... 180/197 |
| 4,681,374 | 7/1987 | Nakamura et al. ............. 180/197 X |

FOREIGN PATENT DOCUMENTS

58-56925 4/1983 Japan ................................. 180/247
60-121129 6/1985 Japan .

Primary Examiner—John J. Love
Assistant Examiner—Charles R. Watts
Attorney, Agent, or Firm—Armstrong, Nikaido, Marmelstein & Kubovcik

[57] ABSTRACT

A slip control method controls slip of the driving wheels of a vehicle. The method includes detecting excess slip of the driving wheels of the vehicle during acceleration, and reducing a driving force to said driving wheels upon detection of said excess slip in order to limit the slip of the driving wheels. The slip control of said driving wheels is inhibited upon detection of the application of a parking brake of the vehicle, or upon the detection of the transmission of the vehicle as being in the reverse gear position.

3 Claims, 4 Drawing Sheets

METHOD FOR CONTROLLING SLIP OF A DRIVING WHEEL OF A VEHICLE

BACKGROUND OF THE INVENTION

The present invention relates to a slip control method for controlling the slip of driving wheels of a vehicle, and more particularly to a slip control method for controlling the slip of the driving wheels during starting or acceleration of the vehicle. The instant method of slip control may be employed with systems disclosed in commonly owned U.S. patent applications, Ser. No. 021,892, filed Mar. 4, 1987 and entitled "Traction Control System for Controlling Slip of a Driving Wheel of a Vehicle", and Ser. No. 048,424, filed May 11, 1987 and entitled, "Traction Control System for Controlling Slip of a Driving Wheel of a Vehicle". The disclosures of the above patent applications are hereby incorporated by reference.

Generally, when the traction force of the driving wheels during the acceleration or starting up of the vehicle becomes greater than a friction force between a wheel and the road surface [(a coefficient of friction between the wheel and the road surface) x (load on a driving wheel by the vehicular weight (vehicular load))], the driving wheels slip. A slip rate indicating a degree of such slip is obtained by the following equation (I), where $V_w$ denotes a circumferential speed of the driving wheels, and V denotes a vehicle speed (a circumferential speed of driven wheels).

$$\lambda = (V_w - V)/V_w \quad \ldots (\text{I})$$

The friction force between the wheel and the road surface (namely, a limit value of the traction force of the driving wheels) varies with the slip rate $\lambda$, and the friction force in the traveling direction (the longitudinal direction) of the vehicle reaches its maximum value at a predetermined value $\lambda_0$. While the above friction force between the wheel and the road surface is a friction force in the longitudinal direction of the vehicle, a friction force in the lateral direction (side force) decreases with an increase in the slip rate $\lambda$.

On the basis of this point, there has been proposed a control method for detecting a slip rate $\lambda$ which maximizes the longitudinal friction force between the wheel and the road surface in order to maximize the driving efficiency of the vehicle and also suppresses the decrease in the lateral friction force between the wheel and the road surface in order to prevent side slip of the vehicle, and for approximating the slip rate $\lambda$ to the predetermined value $\lambda_0$. Specifically, in the conventional method, a lower limit value $\lambda_1$ and an upper limit value $\lambda_2$ of the slip rate $\lambda$ define a predetermined range including the predetermined value $\lambda_0$, and $\lambda_1$ and $\lambda_2$ are set according to the vehicle speed V. The torque of the driving wheels is controlled by a driving wheel torque control device according to a value of the slip rate $\lambda$ calculated from the driving wheel speed $V_w$ and the vehicle speed V. Consequently the circumferential speed $V_w$ of the driving wheels is controlled and the slip rate $\lambda$ of the driving wheels is feed-back controlled within the predetermined range $\lambda_1 - \lambda_2$.

In the conventional method as described above, a premise for slip control of the driving wheels is that the driven wheels do not slip, and thus the vehicle speed can be precisely detected by the speed of the driven wheels. In a front wheel drive car the front wheels are the driving wheels and the rear wheels are the driven wheels. Conversely, in a rear wheel drive car, the rear wheels are the driving wheels and the front wheels are the driven wheels. Accordingly, when the brake is applied to the driven wheels, a brake switch or a clutch switch detects such a braking condition to inhibit the slip control of the driving wheels (This method is disclosed in Japanese Pat. Laid-Open No. 60-121129, for example).

In specialized sports motoring rather than normal street driving, a so-called spin turn or hand brake turn is sometimes executed by braking and locking only the rear wheels by means of the parking brake in order to induce slipping of the rear wheels and thus rapidly slide the rear end of the car around. In this case, since the clutch is not disengaged in a front-wheel drive vehicle, the slip control is still operative. Although it is assumed that the vehicle speed is zero by locking the rear wheels (the driven wheels) to stop the rotation thereof, the front wheels (the driving wheels) continue to rotate. Therefore, if the slip rate $\lambda$ is calculated in accordance with equation (I), it is inaccurately assumed that the driving wheels are slipping. As a result, a fuel cut control or the like is generated in order to reduce the driving force. When the vehicle is then accelerated just after such a hand brake turn, acceleration performance is reduced, or engine stall occurs upon the hand brake turn due to the operation of the slip control system. Therefore, in the above conventional system, the undesirable result of reduced acceleration performance or engine stall may occur as the result of a hand brake turn.

Additionally, according to the conventional slip control method described above, even when an accelerator pedal is rapidly depressed when starting movement of the vehicle, the torque of the driving wheels can be properly controlled to prevent the slip of the driving wheels.

However, in specialized sports motoring rather than normal street driving, slipping the driving wheels is desireable and therefore is intentionally utilized in some cases. For example, when starting a front-wheel drive vehicle on a slippery road surface such as a snowy road or a frozen road, the transmission is shifted to the reverse gear position, and the steering wheel is rotated just enough to provide a small steering angle for the front wheels. Then, under this condition, the accelerator pedal is fully depressed to intentionally slip the front wheels (the driving wheels) and turn the vehicle about the rear wheels in such a manner as to draw a sectoral track. This maneuver is referred to as a back turn. In a vehicle using the conventional slip control method, the driving wheels cannot be intentionally slipped in order to perform a back turn.

SUMMARY OF THE INVENTION

It is an object of the present invention to provide a slip control method for controlling slip of the driving wheels of a vehicle, which may also prevent the deterioration of acceleration performance and the occurrence of an engine stall when a hand brake turn or the like is executed by applying the parking brake when executing the turn.

According to the present invention, a slip control is provided for preventing slip of the driving wheels of a vehicle, comprising the steps of detecting excess slip of the driving wheels during acceleration of the vehicle, and reducing a driving force of the driving wheels upon detection of the excess slip in order to limit the slip of the driving wheels, wherein the application of the parking brake of the vehicle is detected, and the slip control of the driving wheels is inhibited upon detection of the application of the parking brake.

It is a further object of the present invention to provide a slip control method for controlling slip of the driving wheels of a vehicle, which permits the execution of a back turn of the vehicle in specialized motoring, and allows the slip control of the driving wheels to properly operate under normal driving conditions.

According to the present invention, a slip control method is also provided for controlling slip of the driving wheels of a vehicle, including the steps of detecting excess slip of the driving wheels during acceleration of the vehicle, and reducing a driving force upon detection of the excess slip, wherein a gear ratio of the vehicle transmission is detected, and the slip control of the driving wheels is inhibited when the transmission is detected to be in a reverse gear position.

BRIEF DESCRIPTION OF THE DRAWINGS

The advantages of the invention will become apparent in the following description taken in conjuction with the drawings, wherein.

DETAILED DESCRIPTION OF THE PREFERRED EMBODIMENT

Figure 1:
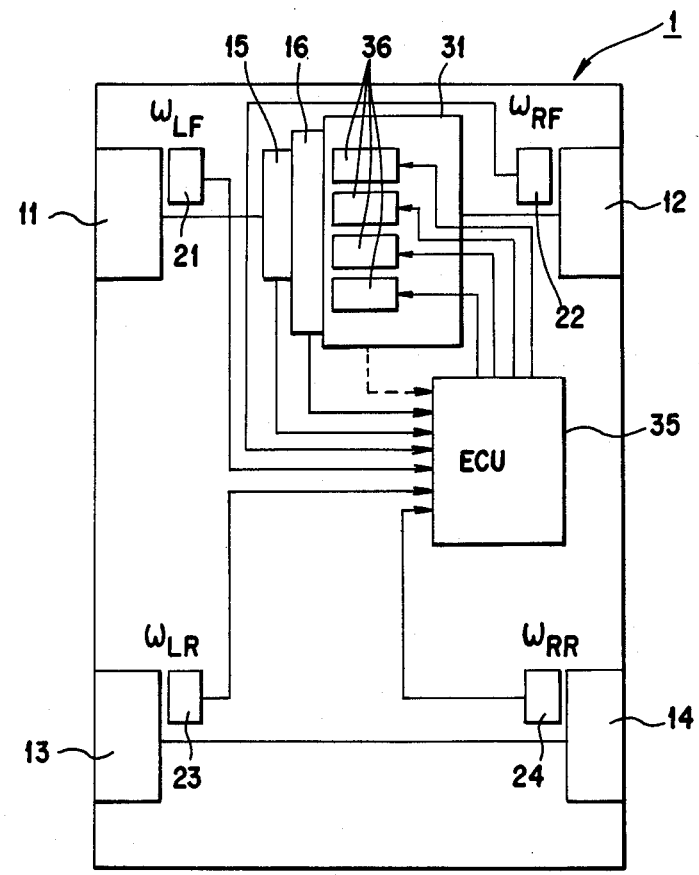
FIG. 1 is a schematic illustration of a vehicle employing the slip control method for controlling the slip of the driving wheels of the vehicle according to the present invention.

FIG. 1 illustrates a vehicle 1 employing the slip control method for the driving wheels of the vehicle according to the present invention. Vehicle 1 is, for example, a front-wheel drive vehicle having front wheels 11 and 12 as the driving wheels adapted to be driven by an engine 31 and having rear wheels 13 and 14 as driven or trailing wheels. As will be apparent from the following description, the present invention is similarly applicable to a rear-wheel drive vehicle where the rear wheels are the driving wheels and the front wheels are the driven or trailing wheels. The driving wheels 11 and 12 are provided with driving wheel speed sensors 21 and 22, respectively, while the trailing wheels 13 and 14 are provided with trailing wheel speed sensors 23 and 24, respectively. Left and right driving wheel speeds $\omega_{LF}$ and $\omega_{RF}$ are detected by the driving wheel speed sensors 21 and 22, respectively, while left and right trailing wheel speeds $\omega_{LR}$ and $\omega_{RR}$ are detected by the trailing wheel speed sensors 23 and 24, respectively. The detection signals (from the speed sensors 21 to 24) are input into ECU (electronic control unit) 35. ECU 35 first computes a vehicle speed V from an average $(\omega_{LR}+\omega_{RR})/2$ of the trailing wheel speeds $\omega_{LR}$ and $\omega_{RR}$. ECU 35 controls slip of the driving wheel having a higher speed (HI select control). That is, the higher one of the driving wheel speeds $\omega_{LF}$ and $\omega_{RF}$ is set to the value of $\omega_F$ corresponding to the driving wheel speed $V_w$ in the afore-mentioned equation (I).

A driven wheel speed or a trailing wheel speed $\omega_{LR}$ or $\omega_{RR}$ on the same side of the vehicle as the driving wheel to be controlled (the higher speed driving wheel) is set to $\omega_R$ in substitution for the vehicle speed V in the afore-mentioned equation (I). Accordingly, the slip rate $\lambda$ can be obtained by the following equation.

$$\lambda=(\omega_F-\omega_R)/\omega_F \ldots \quad (II)$$

A clutch 15 and a transmission 16 interposed between the engine 31 and the driving wheels 11 and 12 are provided with respective sensors (not shown). A clutch signal and a transmission signal from the sensors are input into ECU 35. The transmission sensor indicates which gear is selected in the transmission. A parking brake mechanism for operating respective brakes of the driven wheels 13 and 14 as the rear wheels is provided with a sensor (not shown), and a parking brake signal indicating the operation or application of the parking brake mechanism is input from the sensor into ECU 35. When the ECU 35 determines from the clutch signal, the transmission signal and the parking brake signal that the clutch 15 is engaged, and a gear position of the transmission 16 is not in the reverse position, and the parking brake is not applied, respectively, it controls the engine 31 by a fuel supply control device which will be hereinafter described, thereby controlling the torque of the driving wheels 11 and 12 and controlling the slip rate $\lambda$ of the driving wheels 11 and 12 (See equation II). ECU 35 controls the fuel supply control device in accordance with the following control rule:

(i) If $\lambda>\lambda_0$ the fuel supply control device is so controlled as to reduce the value of $\lambda$. For example, the fuel supply is cut. (Prevention of excess slip rate)

Figure 2:
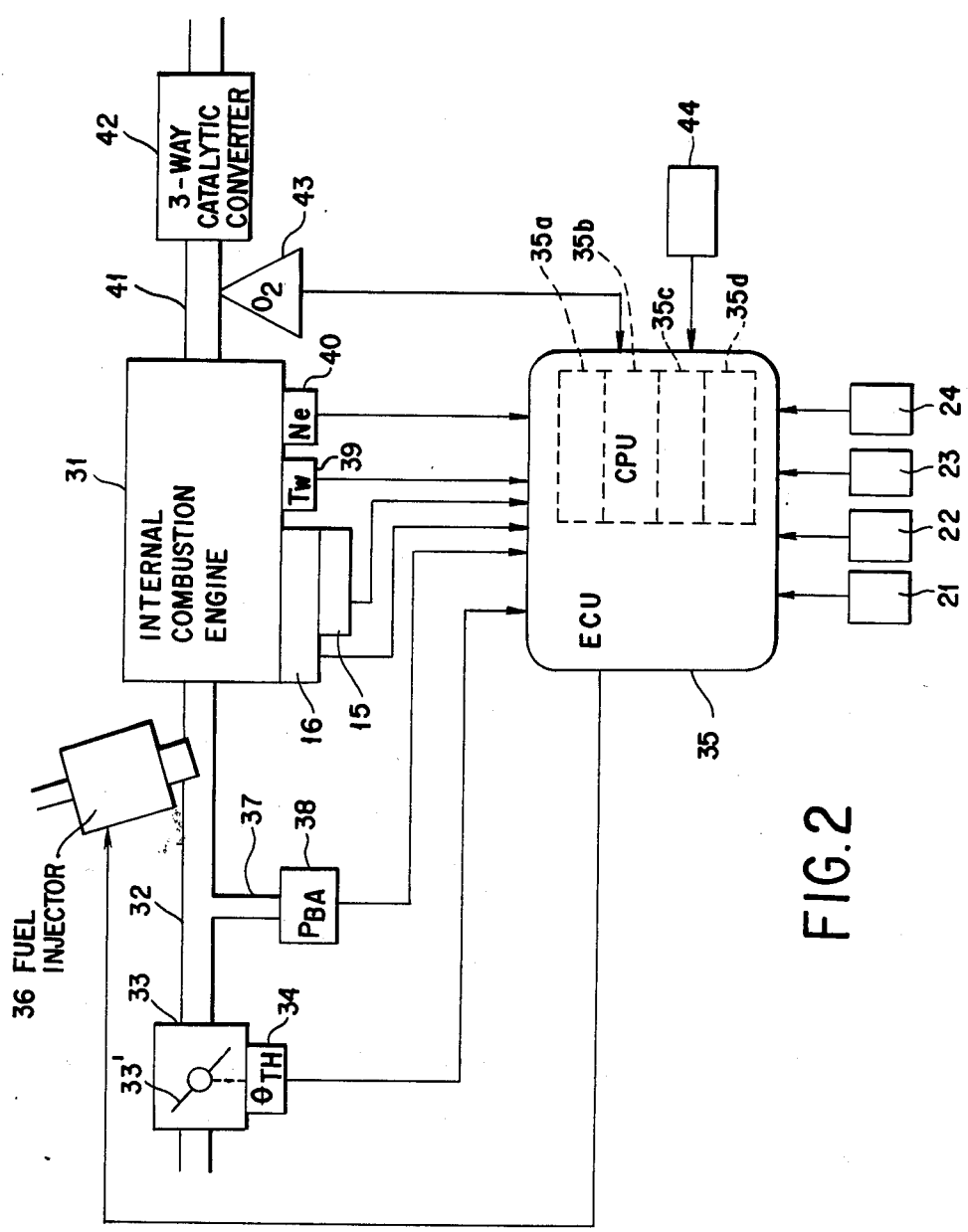
FIG. 2 is a schematic illustration of the fuel supply control device as a device for controlling a driving wheel torque.

Referring to FIG. 2 which shows the general structure of the fuel supply control device, reference numeral 31 designates an internal combustion engine having four cylinders, for example. Of course, the system would be operable on any type of engine. An intake manifold 32 is connected to the engine 31. A throttle body 33 is positioned in intake manifold 32. The throttle body 33 includes a throttle valve 33'. The throttle valve 33' is provided with a throttle valve opening ($\theta_{TH}$) sensor 34 for converting the valve opening of the throttle valve 33' to an electrical signal, which is fed to ECU 35.

Fuel injection valves 36 are positioned in intake manifold 32, for respective cylinders, between engine 31 and throttle body 33 at a position just upstream of intake valves (not shown) for respective cylinders. The fuel injection valves 36 are connected to a fuel pump not shown, and are also electrically connected to the ECU 35, so that a valve opening time of the fuel injection valves 36 may be controlled by signals from ECU 35.

An absolute pressure ($P_{BA}$) sensor 38 positioned downstream of throttle valve 33' and is connected through a pipe 37 to intake manifold 32. The absolute pressure in pipe 37 is converted by sensor 38 to an electrical signal, which is fed to ECU 35.

An engine coolant temperature sensor (hereinafter referred to as a "$T_w$ sensor") 39 is disposed in engine 31 to monitor the temperature of the engine coolant. The $T_w$ sensor 39 consists of a thermistor (or like device) mounted in a peripheral wall of the engine. A detection signal from the $T_w$ sensor 39 is fed to ECU 35. An engine rotational speed sensor (hereinafter referred to as "Ne sensor") 40 is provided at the periphery of a camshaft or a crankshaft (not shown) of the engine. The Ne sensor 40 generates a crank angle position signal (hereinafter referred to as a "TDC (Top Dead Center) signal") at a predetermined crank angle position, for every 180° rotation of the crankshaft of the engine. For example, Ne sensor 40 outputs a TDC signal at a crank angle position before a predetermined crank angle with respect to Top Dead Center (TDC) at the beginning of an intake stroke in each cylinder, and this TDC signal is fed to ECU 35.

A catalytic converter 42 of rhodium is provided in an exhaust pipe 41 from engine 31 to purify HC, CO and NOx in the exhaust gas. An $O_2$ sensor 43 is positioned in the exhaust pipe 41 at a position upstream of the catalytic converter 42. The $O_2$ sensor 43 detects oxygen concentration in the exhaust gas and supplies an $O_2$ concentration signal to ECU 35.

An auxiliary parameter sensor 44 is provided to detect other engine parameters and supply a detection signal relative to the other engine parameters to ECU 35. Furthermore, driving wheel speed sensors 21 and 22 and trailing wheel speed sensors 23 and 24 provide inputs to ECU 35.

ECU 35 includes an input circuit 35a for shaping the input signal waveforms from the various sensors (including the driving wheel speed sensors 21 and 22, the driven wheel speed sensors 23 and 24, the sensor of clutch 15, and the sensor of transmission 16), correcting the voltage levels therefrom to a predetermined level, and converting analog signals to digital signals. ECU 35 further includes a central processing unit (which will be hereinafter referred to as a CPU) 35b, a memory 35c for storing various operation programs and operation results executed in CPU 35b, and an output circuit 35d for supplying a driving signal to fuel injection valve 36.

CPU 35b calculates a fuel injection time $T_{OUT}$ for fuel injection valve 36. Engine parameter signals from the various sensors are supplied through the input circuit 35a every time the TDC signal is input thereto and $T_{OUT}$ is calculated from the following equation:

$$T_{OUT} = Ti \times K_1 + K_2 \quad \ldots \text{(III)}$$

where, Ti is a reference value of the injection time of the fuel injection valve 36, which reference value depends on the engine rotational speed Ne and the absolute pressure $P_{BA}$ in the intake manifold.

$K_1$ and $K_2$ are a correction coefficient and a correction variable, respectively, as calculated in accordance with a predetermined operation expression so as to optimize various characteristics such as starting characteristics, exhaust gas characteristics, fuel consumption characteristics, and acceleration characteristics, according to the operational engine condition as sensed by the engine parameter signals from the aforementioned sensors.

CPU 35b supplies a driving signal to fuel injection valve 36 for opening valve 36 according to the fuel injection time $T_{OUT}$, through the output circuit 35d.

Figure 3:
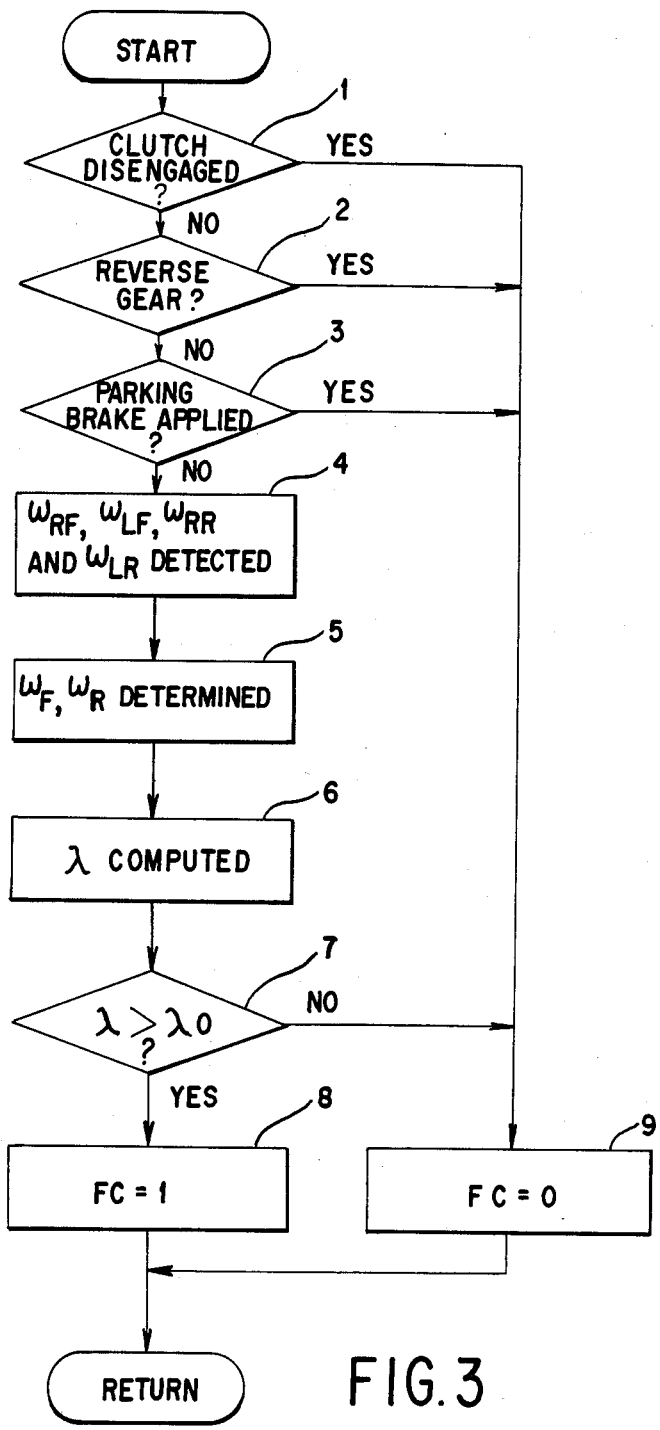
FIG. 3 is a flow chart of the slip control program to be executed in the ECU 35.

FIG. 3 is a flow chart of a slip control program for the driving wheels of the vehicle according to the present invention. The slip control program is executed every predetermined timer period by the CPU 35b.

First, step 1, determines whether or not the clutch 15 is disengaged. If the answer is Yes, a fuel cut flag FC is reset to 0, in order to inhibit the slip control for the driving wheels (step 9). Then, the program is ended.

If the answer is No in step 1, step 2 determines whether or not the transmission 16 is in a reverse gear position. If the answer is Yes, the fuel cut flag FC is reset to 0, in order to inhibit the slip control for the driving wheels (step 9). Then, the program is ended.

If the answer is No in step 2, it is determined in step 3 whether or not the parking brake is applied. If the answer is Yes, the fuel cut flag FC is reset to 0, in order to inhibit the slip control for the driving wheels (step 9). Then, the program is ended.

If the answer is No in step 3, the program proceeds to the following step 4, in which the slip control for the driving wheels 11 and 12 is carried out.

In step 4, the speeds $\omega_{LF}$ and $\omega_{RF}$ of the left and right driving wheels 11 and 12 and the speeds $\omega_{LR}$ and $\omega_{RR}$ of the left and right driven wheels 13 and 14 are detected.

In step 5, the values of $\omega_F$ and $\omega_R$ in the equation (II) are decided. That is, the value of $\omega_F$ is set to the larger one of the speeds $\omega_{LF}$ and $\omega_{RF}$ of the left and right driving wheels, while the value of $\omega_R$ is set to the speed ($\omega_{LR}$ or $\omega_{RR}$) of the driven wheel on the same side as the selected driving wheel. In step 6, the slip rate $\lambda$ of the driving wheels is computed in accordance with equation (II).

In step 7, it is determined whether or not the slip rate $\lambda$ as computed above exceeds the predetermined value $\lambda_0$. If the answer is Yes, the fuel cut flag FC is set to 1, so as to limit slip of the driving wheels (step 8). Then, the program is ended. If the answer is No in step 7, the fuel cut flag FC is reset to 0 (step 9), and the program is ended.

Figure 4:
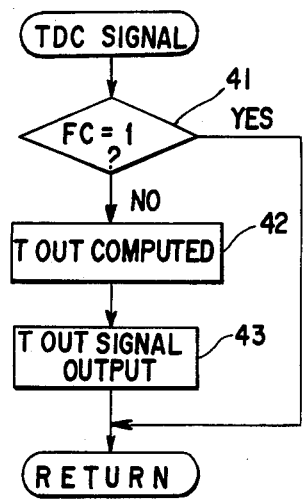
FIG. 4 is a flow chart of the fuel supply control program.

FIG. 4 shows a flow chart of a fuel supply control program, which is executed by the CPU 35b every time the TDC signal is generated. This program is executed in preference over the program shown in FIG. 3. Namely, the program of FIG. 4 is so executed as to interrupt the processing of the program of FIG. 3.

In step 41, it is determined whether or not the fuel cut flag FC to be set or reset in the program of FIG. 3 is set to 1. If the answer is Yes, it means that the fuel cut is to be executed, and therefore, the program is ended at once. If the answer is No in step 41, the valve opening time $T_{OUT}$ of the fuel injection valve is computed (step 42), and then a valve opening driving signal according to the value $T_{OUT}$ is output (step 43). Then, the program is ended.

As described above, the present invention includes the steps of detecting excess slip of the driving wheels during acceleration of the vehicle, and reducing a driving force of the driving wheels upon detection of the excess slip to limit slip of the driving wheels, wherein the application of a parking brake of the vehicle is detected, and the slip control of the driving wheels is inhibited upon detection of the application of the parking brake. Accordingly, it is possible to prevent deterioration of acceleration performance and occurrence of an engine stall when a hand brake turn or the like is executed by applying the parking brake when executing the turn.

The present invention also includes the step of detecting the gear ratio of the transmission of the vehicle, and inhibiting the slip control of the driving wheels when the transmission is in a reverse gear position. Accordingly, it is possible for a back turn of the vehicle to be performed in specialized motoring and still allow the slip control of the driving wheels to properly operate under normal driving conditions.

Although a specific form of embodiment of the instant invention has been described above and illustrated in the accompanying drawings in order to be more clearly understood, the above description is made by way of example and not as a limitation to the scope of the invention. It is contemplated that various modifications apparent to one of ordinary skill in the art could be made without departing from the scope of the invention which is to be determined by the following claims.

We claim:

1. A slip control method for controlling slip of the driving wheels of a vehicle, comprising the steps of:
    detecting excess slip of the driving wheels of the vehicle during acceleration; and
    reducing a driving force to said driving wheels upon detection of said excess slip in order to limit the slip of the driving wheels, wherein the slip control of said driving wheels is inhibited upon detection of the application of a parking brake of the vehicle.

2. A slip control method for controlling slip of the driving wheels of a vehicle, comprising the steps of:
    detecting excess slip of the driving wheels of the vehicle during acceleration; and
    reducing a driving force to said driving wheels upon detection of said excess slip in order to limit the slip of the driving wheels, wherein a gear ratio of a transmission of the vehicle is detected, and slip control of the driving wheels is inhibited when said transmission is detected to be in a reverse gear position.

3. A slip control method for controlling slip of the driving wheels of a vehicle, comprising the steps of:
    detecting excess slip of the driving wheels of the vehicle during acceleration; and
    reducing a driving force to said driving wheels upon detection of said excess slip in order to limit the slip of the driving wheels, wherein the slip control of said driving wheels is inhibited when at least one of the following conditions is detected:
    (a) an associated parking brake is applied, and
    (b) an associated transmission is in a reverse gear position.

* * * * *